United States Patent
Xu et al.

(10) Patent No.: US 9,741,107 B2
(45) Date of Patent: Aug. 22, 2017

(54) FULL REFERENCE IMAGE QUALITY ASSESSMENT BASED ON CONVOLUTIONAL NEURAL NETWORK

(71) Applicants: Xun Xu, Cupertino, CA (US); Peng Ye, Foster City, CA (US)

(72) Inventors: Xun Xu, Cupertino, CA (US); Peng Ye, Foster City, CA (US)

(73) Assignee: SONY CORPORATION, Tokyo (JP)

(*) Notice: Subject to any disclaimer, the term of this patent is extended or adjusted under 35 U.S.C. 154(b) by 153 days.

(21) Appl. No.: 14/732,518

(22) Filed: Jun. 5, 2015

(65) Prior Publication Data

US 2016/0358321 A1    Dec. 8, 2016

(51) Int. Cl.

| G06T 7/00 | (2017.01) |
|---|---|
| G06T 5/00 | (2006.01) |
| G06K 9/66 | (2006.01) |
| G06K 9/46 | (2006.01) |
| G06K 9/62 | (2006.01) |
| G06N 3/08 | (2006.01) |

(52) U.S. Cl.
CPC .............. *G06T 7/0002* (2013.01); *G06K 9/46* (2013.01); *G06K 9/6215* (2013.01); *G06K 9/66* (2013.01); *G06N 3/08* (2013.01); *G06T 5/002* (2013.01); *G06T 2207/10016* (2013.01); *G06T 2207/20081* (2013.01); *G06T 2207/30168* (2013.01)

(58) Field of Classification Search
CPC ........ G06T 7/0002; G06T 3/4084; G06K 9/66
See application file for complete search history.

(56) References Cited

U.S. PATENT DOCUMENTS

| 7,590,287 B2 | 9/2009 | Lu |
| 7,936,916 B2 | 5/2011 | Zhang |
| 2013/0163896 A1* | 6/2013 | Chen ................... G06T 7/0036 382/278 |

(Continued)

FOREIGN PATENT DOCUMENTS

WO        2014094313        6/2014

OTHER PUBLICATIONS

Kang et al. "Convolutional neural networks for no-reference image quality assessment." In: Proceedings of the IEEE Conference on Computer Vision and Pattern Recognition. Jun. 28, 2014 (Jun. 28, 2014) Retrieved from <http://www.cv-foundation.org/openaccess/content_cvpr_2014/papers/Kang_Convolutional_Neural_Networks_2014_CVPRpaper.pdf>, entire document.*

(Continued)

*Primary Examiner* — Iman K Kholdebarin
*Assistant Examiner* — Mai Tran
(74) *Attorney, Agent, or Firm* — Trellis IP Law Group, PC

(57) ABSTRACT

Embodiments generally relate to providing systems and methods for assessing image quality of a distorted image relative to a reference image. In one embodiment, the system comprises a convolutional neural network that accepts as an input the distorted image and the reference image, and provides as an output a metric of image quality. In another embodiment, the method comprises inputting the distorted image and the reference image to a convolutional neural network configured to process the distorted image and the reference image and provide as an output a metric of image quality.

10 Claims, 6 Drawing Sheets

(56) References Cited

U.S. PATENT DOCUMENTS

2015/0117763 A1* 4/2015 Zhang .................. G06T 7/0002 382/159

OTHER PUBLICATIONS

Jaderberg et al. "Speeding up convolutional neural networks with low rank expansions." In: arXiv preprint arXiv: 1405.3866. May 15, 2014 (May 15, 2014) Retrieved from <https://arxiv.org/pdf/1405.3866.pdf>, entire document.*

Zhang et al. "FSIM: a feature similarity index for image quality assessment." In: IEEE transactions on Image Processing. Jan. 31, 2011 (Jan. 31, 2011) Retrieved from <http://www4.comp.polyu.edu.hk/-cslzhang/IQA/TIP_IQA_FSIM.pdf>, entire document.*

Lecun et al. "Deep learning tutorial." In: Tutorials in International Conference on Machine Learning. Jun. 16, 2013 (Jun. 16, 2013) Retrieved from <http://www.cs.nyu.edu/-yann/talks/lecun-ranzato-icml2013.pdf>, slide 1, 75.*

Livni et al. "On the computational efficiency of training neural networks." In: Advances in Neural Information Processing Systems. Oct. 28, 2014 (Oct. 28, 2014) Retrieved from <https://arxiv.org/pdf/1410.1141.pdf>, entire document.*

Sakanashi et al. "Comparison of superimposition and spaise models in blind source separation by multichannel Wiener filter." In: Signal & Information Processing Association Annual Summit and Conference (APSIPA ASC). Dec. 6, 2012 (Dec. 6, 2012) Retrieved from <http://www.apsipa.org/proceedings_2012/papers/140.pdf>, entire document.*

Hu, A., Zhang, R., Yin, D., & Zhan, Y. (2014). Image quality assessment using a SVD-based structural projection. Signal Processing: Image Communication, 29(3), 293-302. doi:10.1016/j.image.2014.01.007.*

A universal Full Reference image Quality Metric based on a neural fusion approach Fusion Approach; Aladine Chetouani, Azeddine Beghdadi, Mohamed Deriche2/ IEEE; Sep. 2010.

Image quality assessment using a neural network approach; A. Bouzerdoum, A. Havstad, and A. Beghdadi; Dec. 2000.

* cited by examiner

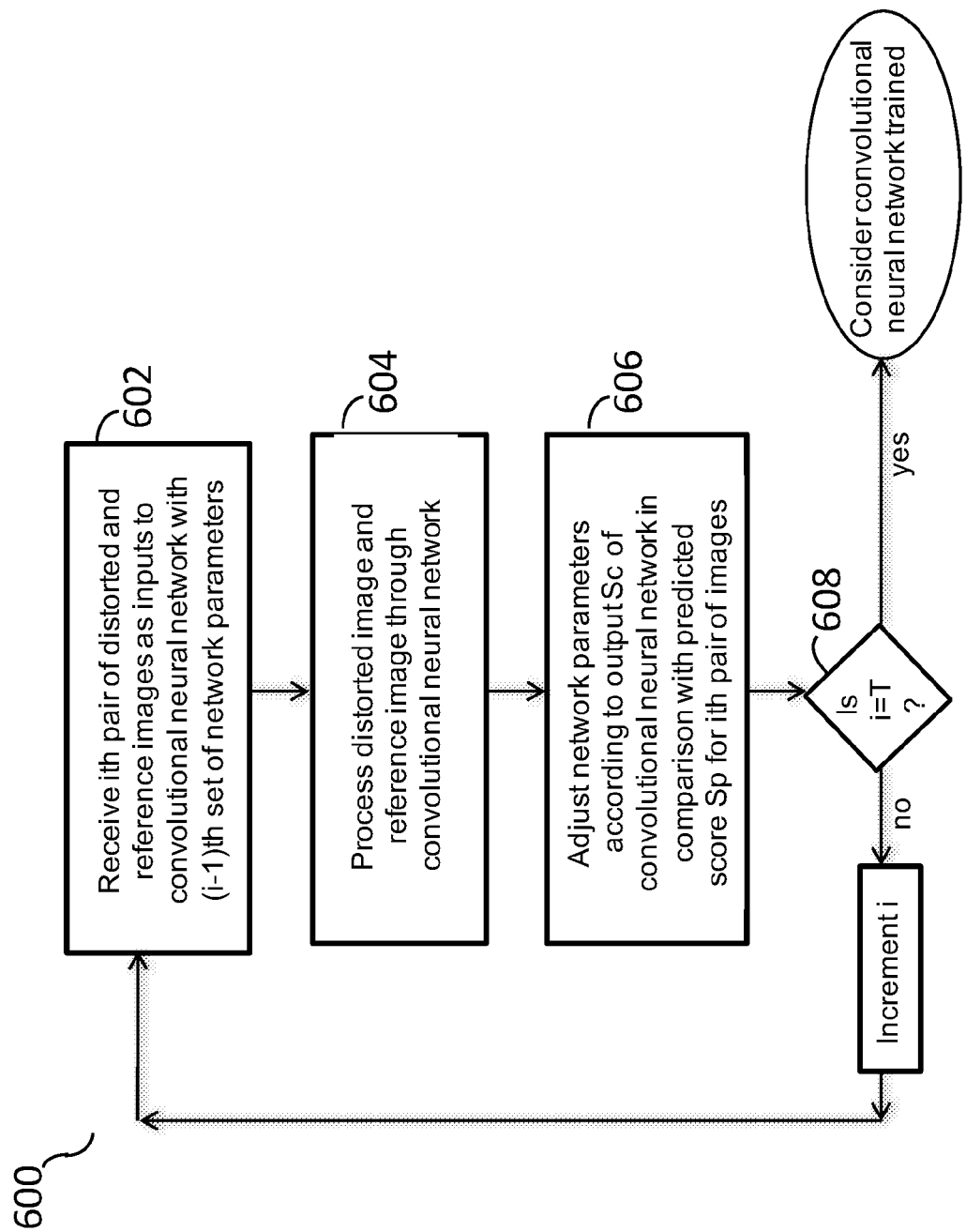

FULL REFERENCE IMAGE QUALITY ASSESSMENT BASED ON CONVOLUTIONAL NEURAL NETWORK

BACKGROUND

With the development and popularity of digital imaging devices and communication technologies, digital images have become increasingly important for information representation and communication. During the life cycle of a digital image, it can be degraded at various stages and such quality degradation may lead to failures in applications at subsequent stages. It is therefore important to maintain and monitor image quality in numerous image and video processing systems, a primary goal of such Image Quality Assessment (IQA) being a prediction of visual quality as perceived by a human viewer. Image quality measures can be used to assess the dependence of perceived distortion as a function of parameters such as transmission rate and also for selecting the optimal parameters of image enhancement methods. Although subjective tests may be carried out in laboratory settings to perform IQA, such tests are expensive and time-consuming, and cannot be used in real-time and automated systems. Therefore, the possibility of developing objective IQA metrics to measure image quality automatically and efficiently is of great interest.

Full-Reference IQA (FR-IQA) models utilize information from both the distorted image and a corresponding pristine reference image for estimating visual quality. Conventional FR-IQA metrics such as the Mean Squared Error (MSE) or Peak Signal-to-Noise Ratio (PSNR) directly measure the pixel-by-pixel differences between the distorted and the reference images in the spatial domain. These types of metrics measure signal fidelity but often have poor correlation with human perception, especially when the noise is not additive.

Two types of approaches have been taken towards developing perceptual visual quality metrics (PVQMs) that align better with human perceptions: bottom-up and top-down approaches. The bottom-up approaches attempt to model various processing stages in the visual pathway of the human visual system (HVS) by simulating relevant psychophysical and physiological properties including contrast sensitivity, luminance adaption, various masking effects and so on. However, given our limited knowledge of these properties and their combined influence on final perception, the HVS is too complicated to be modeled accurately in this way.

More recent research efforts have been directed to top-down frameworks, which model the input-output relationship by incorporating knowledge from various sources such as the statistical properties of natural images, and data on the way image distortions seem to be handled by the HVS. Most state-of-the-art FR-IQA methods fall into this category, and some, such as the Structural SIMilarity (SSIM) index and its variants (including the Multi-Scale SSIM (MS-SSIM) and the Information Weighted SSIM (IW-SSIM)), the Feature SIMilarity (FSIM) index and the Gradient Magnitude Similarity Deviation (GMSD), have had a measure of success, suggesting that low-level visual features such as mean intensity, standard deviation of intensity, phase congruency and gradient magnitude are effective quality indicators. However, these low-level cues may not work uniformly well across different distortion categories. As a result, the performance of corresponding FR measures may vary a lot across different types of distortions.

There is therefore a need for improved methods of assessing image quality that align well with human perception across different types of distortions but are also objective, driven by measurable data, and efficient. Some efforts have been made towards applying learning-based approaches employing convolutional neural networks (ConvNet), but these have been limited to situations where reference images are not available for quality estimation, i.e. for No-Reference IQA (NR-IQA). There therefore remains a need to explore and develop the application of such methods to FR-IQA, where corresponding pairs of reference and distorted images are available for analysis.

SUMMARY

Embodiments generally relate to providing systems and methods for assessing image quality of a distorted image relative to a reference image. In one embodiment, the system comprises a convolutional neural network that accepts as an input the distorted image and the reference image, and provides as an output a metric of image quality. In another embodiment, the method comprises inputting the distorted image and the reference image to a convolutional neural network configured to process the distorted image and the reference image and provide as an output a metric of image quality.

In yet another embodiment, a method is provided for training a convolutional neural network to assess image quality of a distorted image relative to a reference image. The method comprises selecting an initial set of network parameters as a current set of network parameters for the convolutional neural network; for each of a plurality of pairs of images, each pair consisting of a distorted image and a corresponding reference image, processing the pair of images through the convolutional neural network to provide a computed similarity score metric Sc; and adjusting one or more of the network parameters of the current set of network parameters based on a comparison of the distortion score metric S and an expected similarity score metric Sp for the pair; wherein the expected similarity score metric Sp is provided by human perception.

A further understanding of the nature and the advantages of particular embodiments disclosed herein may be realized by reference of the remaining portions of the specification and the attached drawings.

BRIEF DESCRIPTION OF THE DRAWINGS

FIG. 6 is a flowchart showing steps of a method of training a convolutional neural network to assess the image quality of a distorted image relative to a reference image according to one embodiment.

DETAILED DESCRIPTION OF EMBODIMENTS

Figure 1:
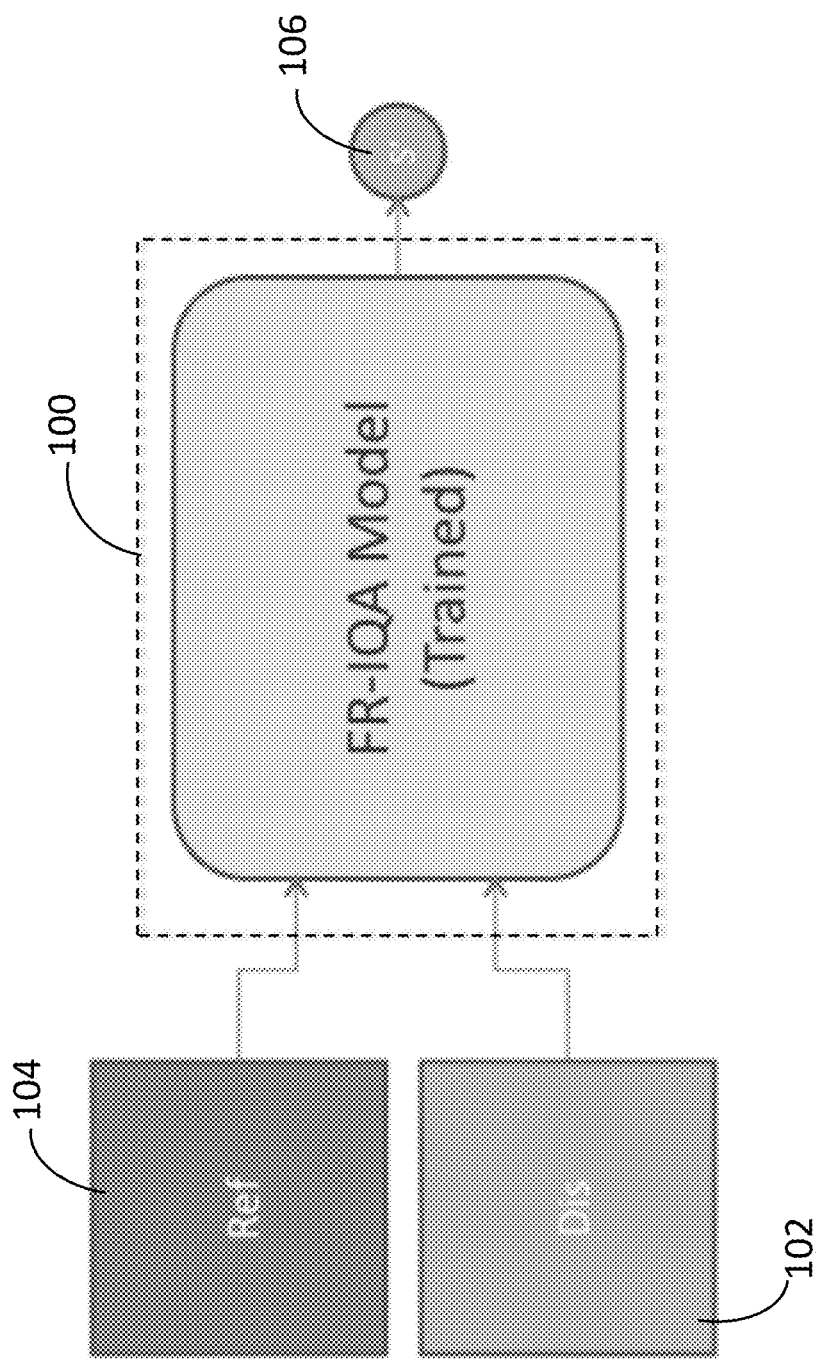
FIG. 1 schematically illustrates the use of a system for assessing image quality of a distorted image relative to a reference image according to one embodiment.

FIG. 1 schematically illustrates the use of a system 100 for assessing image quality of a distorted image 102 relative to a reference image 104 according to one embodiment. System 100 includes a network of interconnected modules or layers, further described below in reference to FIG. 2, that embody a trained FR-IQA model. Image data from each of the distorted image 102 and the reference image 104 are fed into system 100, which in turn produces output metric 106, indicative of the quality of distorted image 102 as likely to be perceived by a human viewer.

Figure 2:
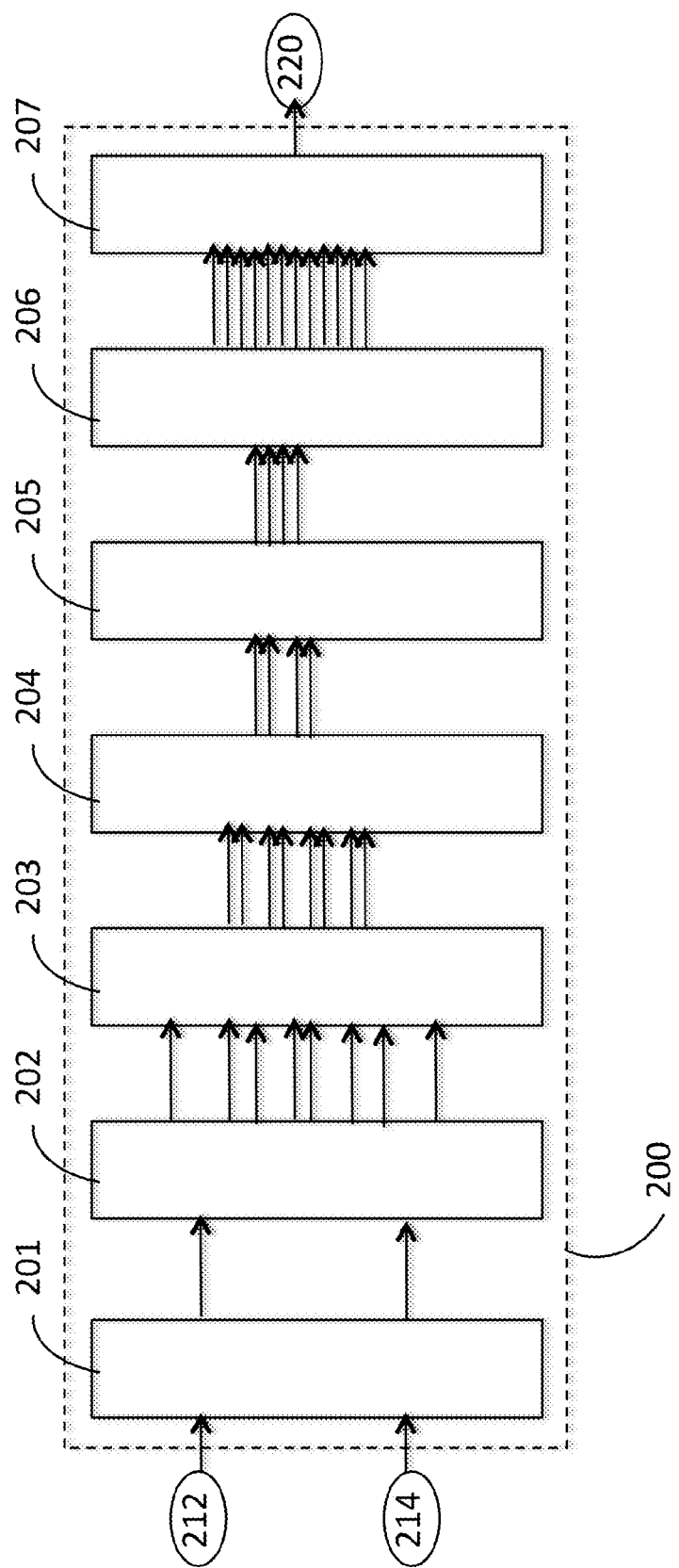
FIG. 2 illustrates the architecture of a system for assessing image quality of a distorted image relative to a reference image according to one embodiment.

FIG. 2 illustrates a schematic view of the architecture of a system 200 that may be used for assessing image quality of a distorted image 212 relative to a reference image 214 according to one embodiment. System 200 comprises a plurality of layers, 201 through 207. It may be helpful to consider system 200 as a two-stage system, where the first stage consists of layers 201 through 205, collectively providing data to the second stage, layers 206 and 207. This second stage may be thought of as a "standard" neural network, while the combination of first and second stages makes system 200 a convolutional neural network.

Image data from distorted image 212 and reference image 214 are fed into input layer 201, which acts to normalize both sets of image data providing a normalized distorted image and a normalized reference image. Image data from the normalized distorted and reference images are fed into convolution layer 202, which acts to convolve each of the normalized distorted image and the normalized reference image with a plurality N1 of filters, and applies a squared activation function to each pixel of each image, to provide N1 pairs of feature maps. Each pair of feature maps contains one filtered normalized distorted image and one correspondingly filtered and normalized reference image.

Image data from the N1 pairs of feature maps are fed into linear combination layer 203 which computes N2 linear combinations of the N1 feature maps corresponding to distorted image 212 and N2 linear combinations of the corresponding N1 feature maps corresponding to the reference image 214, providing N2 pairs of combined feature maps. Each pair of combined feature maps contains one combination of filtered normalized distorted images and one corresponding combination of filtered and normalized reference images.

Similarity computation layer 204 acts on the data from the N2 pairs of combined feature maps received from liner combination layer 203 to compute N2 similarity maps. Each similarity map is computed on the basis of data from corresponding patches of pixels from one pair of combined feature maps, with each similarity map corresponding to a different one of the N2 pairs of combined feature maps.

Data from the similarity maps are fed into pooling layer 205, which applies an average pooling for each of the N2 similarity maps to provide N2 similarity input values. The N2 similarity input values are fed into fully connected layer 206, which operates on the N2 similarity input values to provide M hidden node values, where M is an integer greater than N2. The M hidden node values are mapped to a single output node by linear regression layer 207. The value at output node is a metric of image quality, indicative of the quality of distorted image 202 as likely to be perceived by a human viewer, based on the training of system 200.

Several hyper-parameters of the neural network 200 may be selected to determine specific different architectures or implementations suited to particular image assessment applications. One is the patch size of pixels in the original distorted and reference images. Other hyper-parameters include the size of the filters (in terms of numbers of pixels) used in the convolution layer, the number N1 of filters used in the convolution layer, the activation function used in the convolution layer, the number N2 of linear combinations computed in the linear combination layer, the number M of hidden nodes in the fully connected layer, and the equation used to compute similarity in the similarity computation layer. Moreover, in some embodiments there may be more than one convolution layer, more than one linear combination layer, and more than one fully connected layer; the respective numbers used are additional hyper-parameters.

Figure 3:
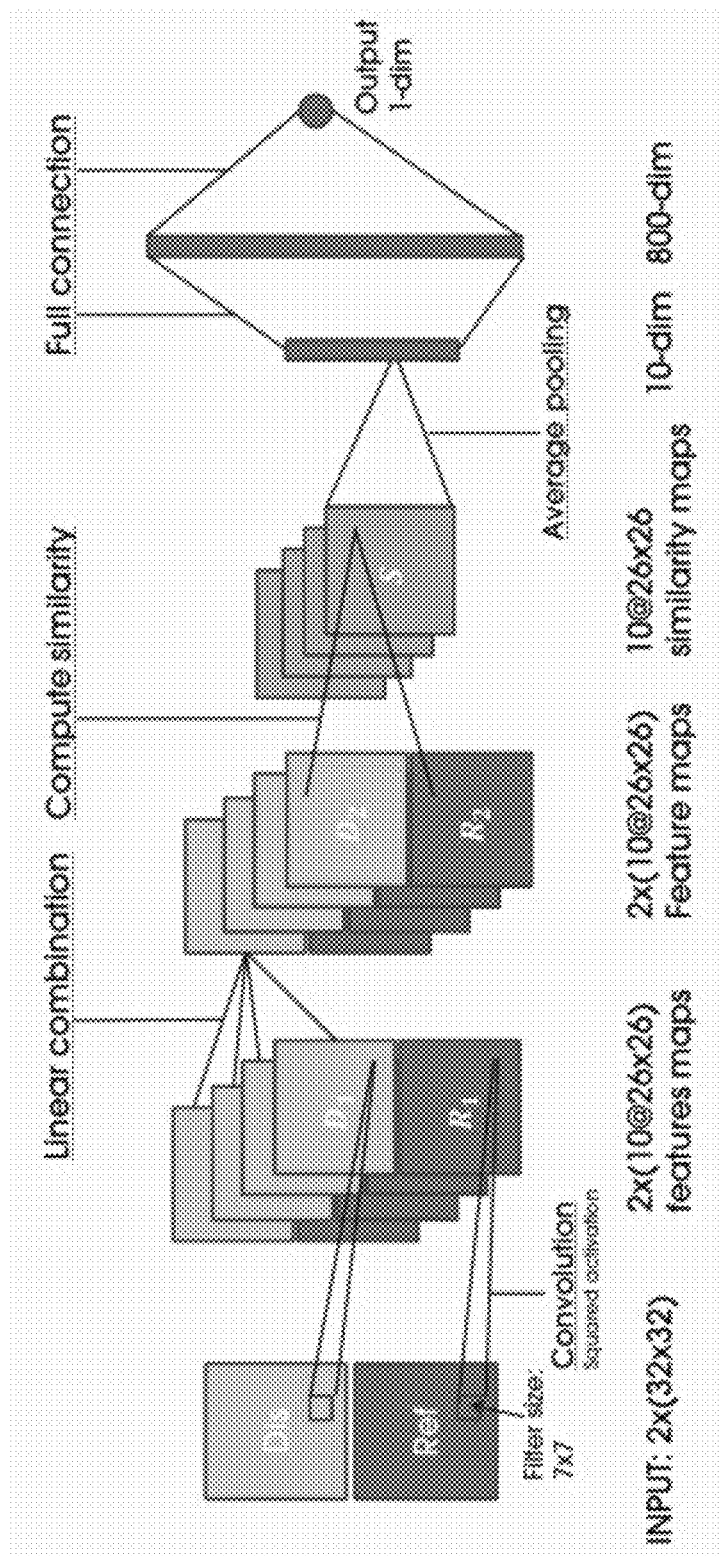
FIG. 3 illustrates one implementation of a layered system for assessing image quality of a distorted image relative to a reference image.

One specific implementation of a convolutional neural network that has been found to be suitable for carrying our image quality assessment is illustrated in FIG. 3, showing a 32×32-7×7×10-1×1×10-800-1 structure. Details of each layer are explained as follows:

The input layer consists of 2 32×32 gray-scale image patches: a distorted image patch $I_{dis}$ and its reference patch $I_{ref}$. Both patches are normalized via a linear transformation function $f(x)=(x-128)/128*1.6$.

In the convolution layer, 10 7×7 linear filters $W_1^k$ (k=1, ..., 10) are applied to the distorted and image patches to provide filtered feature maps $D_1^k$ and $R_1^k$, k=1, ..., 10, for the distorted and reference images respectively, where $$D_1^k = W_1^{k \otimes I_{dis}} \text{ and}$$

$$R_1^k = W_1^{k \otimes I_{ref}}.$$

In other embodiments, filters smaller or greater than 7×7 may be used, depending on the minimum size of the low-level features of interest. Similarly, in some embodiments, fewer than or more than 10 filters may be used, depending on the complexity of the distortions involved. A squared activation function is applied at each pixel of each image patch in this layer.

In the linear combination layer, linear combinations of the filtered feature maps generated by the convolution layer are computed.

$$D_2^k = \sum_{i=1}^{10} W_2^k(i)(D_1^i)^2 \quad (1)$$

$$R_2^k = \sum_{i=1}^{10} W_2^k(i)(R_1^i)^2 \quad (2)$$

In the similarity computation layer, similarities are computed in a point-by-point way (i.e. pixel by pixel) between the combined feature maps from corresponding distorted and reference patches $$S^k = \frac{2D_2^k R_2^k + C}{(D_2^k)^2 + (R_2^k)^2 + C} \quad (3)$$

where $S^k$ is the k-th similarity map and C is a small positive constant.

In the pooling layer, an average pooling is applied for each similarity map. Denoting the output of the pooling layer as $s_{ave}^k$, thus $s_{ave}^k = \text{mean}(S^k)$. The pooling layer provides a 10-dim pooled similarities as inputs to the fully connected layer. In cases where more than 10 filters are used in the convolution layer, producing more than 10 filtered feature maps, and so on, there will be a correspondingly greater dimensionality to the pooled similarity inputs.

In the fully connected layer, the input similarities and densely connected to 800 hidden nodes. A Rectified Linear Unit (ReLU) ($f(x) = \max(x, 0)$) is used as an activation function on the hidden nodes. Denoting the weights in the fully connected layer as $W_3(i,j)(i=1, \ldots, 10; j=1, \ldots, 800)$, the output of the fully connected layer is $$h(j) = \max\left(\sum_{i=1 \cdots 10} W_3(i, j) s_{ave}^i + b_j, 0\right)$$

where $b_j$ is a bias term.

It should be noted that in some embodiments the activation function may include other non-linear operations.

In the linear regression layer, the 800 hidden nodes are mapped to one single output node. If the weights in the linear regression layer are described by $W_4(i)(i=1, \ldots, 800)$ then the output of the network is $$y = \sum_{i=1 \cdots 800} W_4(i) h(i) + b$$

where b is a bias term

Figure 4:
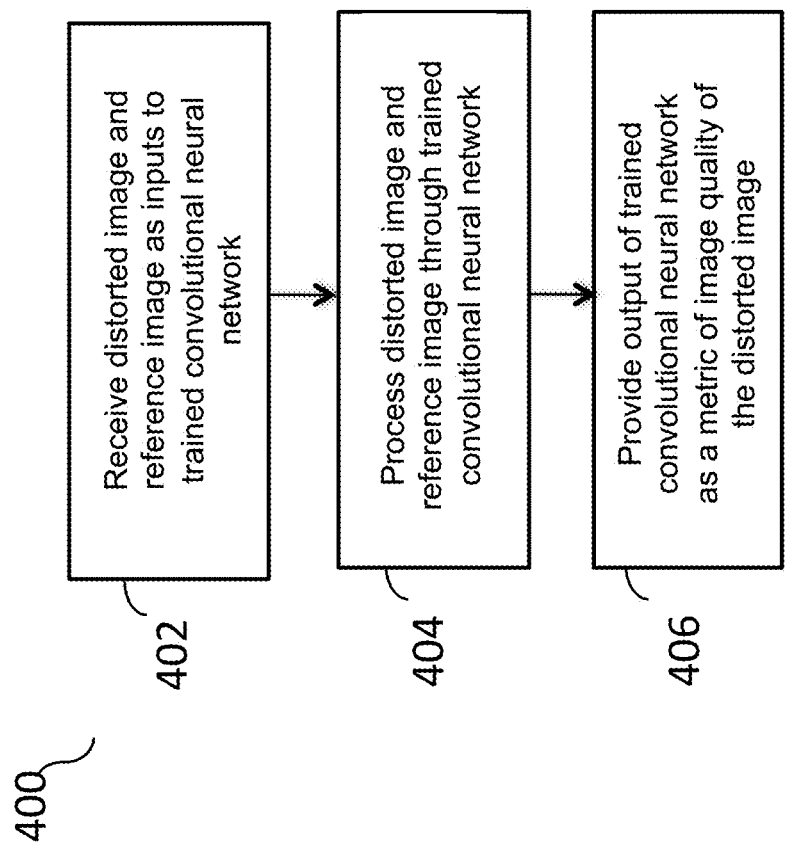
FIG. 4 is a flowchart showing steps of a method for assessing image quality of a distorted image relative to a reference image according to one embodiment.

FIG. 4 is a flowchart showing steps of a method 400 for assessing image quality of a distorted image relative to a reference image according to one embodiment. At step 402, a distorted image and a reference image (that may, for example, be corresponding frames from a distorted and reference video stream) are received as inputs to a trained convolutional neural network. At step 404, the distorted and reference images are processed through the trained convolutional neural network. At step 406, the output of the trained neural network operating on the distorted and reference images is provided as a metric of the image quality of the distorted image.

Figure 5:
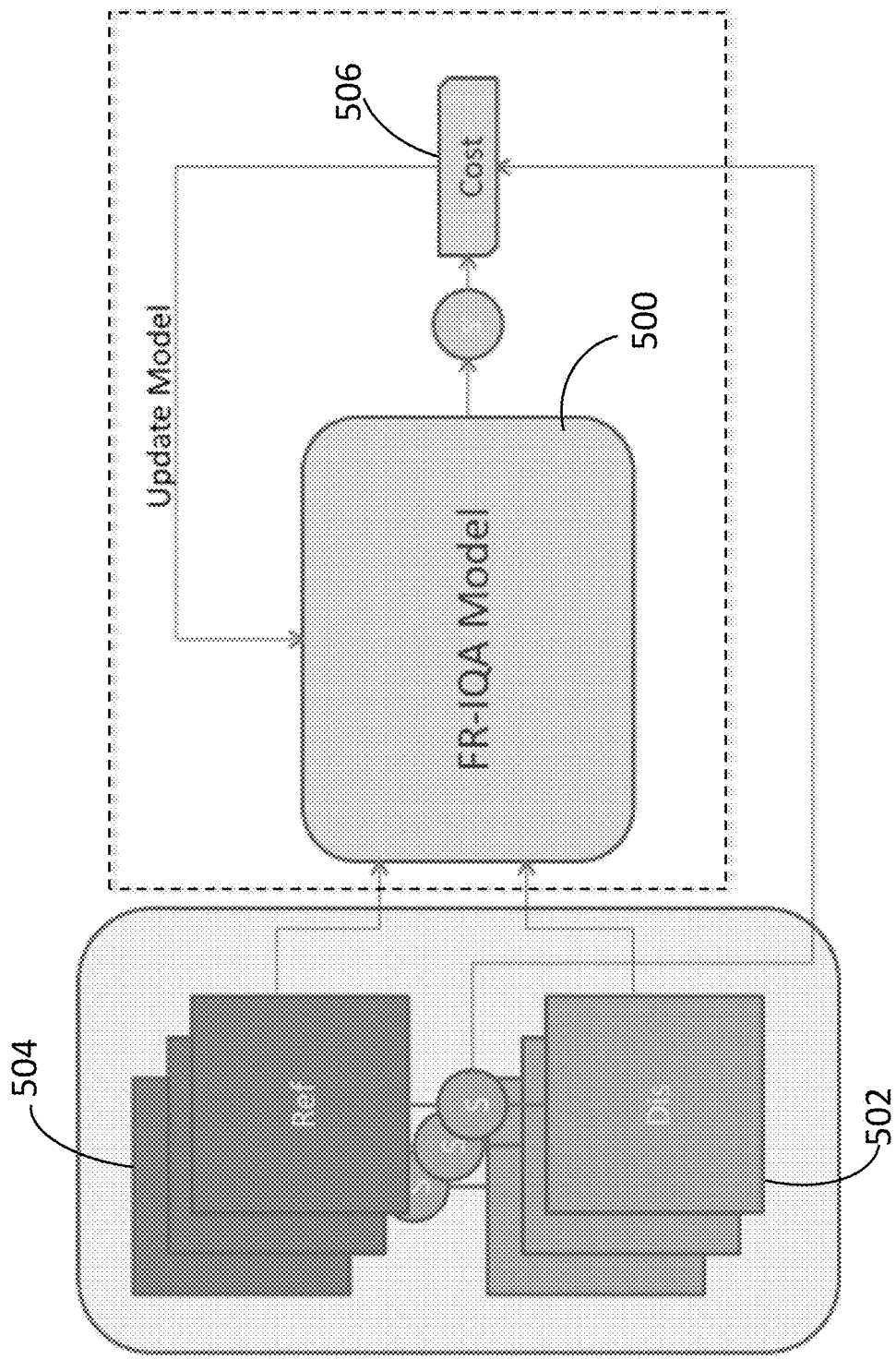
FIG. 5 illustrates a method of training a convolutional neural network to assess the image quality of a distorted image relative to a reference image according to one embodiment.

FIG. 5 illustrates a method of training a convolutional neural network model 500 to assess the image quality of a distorted image relative to a reference image according to one embodiment. An initial set of network parameters is chosen for the models, and a pair of corresponding distorted (502) and reference (504) images, having an expected or predicted similarity score metric S, determined by a human viewer, is provided as an input to the network. The similarity score metric S' provided by the network is compared at cost module 506 with the predicted score metric S, and one or more parameters of model 500 are adjusted in response to that comparison, updating the model. A second pair of distorted and reference images are then processed through network 500 using the adjusted parameters, a comparison is made between the second score metric produced and the score metric expected for this second pair, and further adjustments may be made in response. The process is repeated as desired for the available set of training image pairs, until the final model parameters are set and the model network is deemed to be trained.

FIG. 6 is a flowchart showing steps of a method 600 of training a convolutional neural network to assess the image quality of a distorted image relative to a reference image according to one embodiment. At step 606, a pair of distorted and reference images (the ith pair of a total of T pairs available) is received and input to the network, characterized by a previously selected set of parameters. At step 604, the distorted and reference images are processed through the network. At step 606, the network parameters are adjusted, using an objective function, according to a comparison between the output similarity score Sc computed by the convolutional neural network and the similarity score metric Sp predicted for that pair of images, as perceived by a human viewer. At step 608, it is determined whether other pairs of training images are available that have not yet been processed. If so, one such pair is processed through steps 602 and 604, and network parameters further adjusted at step 606, and a further determination made at step 608 whether all the training image pairs have been processed. When it is determined at step 608 that all the training images have been processed, the neural network may be considered to be trained. In some cases, the training images may be fed into the network more than once to improve the training. The order in which the training images are processed may be random.

In one embodiment, the objective function used to train the network, in determining exactly how the model parameters are adjusted in step 606 of method 600, for example, is the same as that used in standard $\epsilon$-SVR (support vector regression). Letting $(I_{ref}(n), I_{dis}(n))$ denote a pair of input patches, $\gamma_n$ denote the computed similarity score metric (alternatively called the ground truth quality score) and the $f(I_{ref}(n), I_{dis}(n); W)$ denote the predicted similarity score metric for the input pairs with network parameters W, the objective function can be written as:

$$L(W) = \frac{1}{n}\sum_{i=1}^{n} L_\epsilon(f(I_{dis}(n), I_{ref}(n); W), y_n)$$

where
$L_\epsilon$ is defined as follows:

$$L_\epsilon(y, \hat{y}) = \begin{cases} |y - \hat{y}| & |y - \hat{y}| \geq \epsilon \\ 0 & |y - \hat{y}| < \epsilon \end{cases}$$

where $\epsilon$ is a small positive constant that can be adjusted and n is the number of training samples. The network can be trained by performing back-propagation using Stochastic Gradient Descent (SGD).

Regularization methods may be used to avoid over-training the neural network. In one embodiment, the regularization method involves adding the L2 norm of the weights in the linear regression layer in the objective function. This is a widely used method for regularization, which for example has been used in SVM (support vector machine). In particular the objective function can be modified as:

$$L(W) = \frac{1}{n}\sum_{i=1}^{n} L_\epsilon(f(I_{dis}(n), I_{ref}(n); W), y_n) + \lambda_1 \|W_4\|_{L_2}$$

where $\lambda_1$ is a small positive constant.

In some embodiments, the connection of the input nodes and output nodes in the linear combination layer is constrained, so that most output nodes are only connected with a small set of input nodes (instead of all 10 input nodes in the case where N1=10, for example). This constraint may be implemented by adding a sparse binary mask where if $W_{mask}$ (k,i)=0, we enforce $W_2^k(i)$ must be zero. The pattern of connections may be randomly chosen. A mask that has been found to be useful in one particular embodiment is defined as follows:

$$W_{mask} = \begin{bmatrix} 1 & 1 & 0 & 0 & 0 & 0 & 0 & 0 & 0 & 0 \\ 0 & 0 & 1 & 1 & 0 & 0 & 0 & 0 & 0 & 0 \\ 0 & 0 & 0 & 0 & 1 & 1 & 0 & 0 & 0 & 0 \\ 0 & 0 & 0 & 0 & 0 & 0 & 1 & 1 & 0 & 0 \\ 0 & 0 & 0 & 0 & 0 & 0 & 0 & 0 & 1 & 1 \\ 1 & 1 & 1 & 1 & 0 & 0 & 0 & 0 & 0 & 0 \\ 0 & 0 & 0 & 0 & 1 & 1 & 1 & 1 & 0 & 0 \\ 1 & 1 & 0 & 0 & 0 & 0 & 0 & 0 & 1 & 1 \\ 1 & 0 & 1 & 0 & 1 & 0 & 1 & 0 & 0 & 0 \\ 1 & 1 & 1 & 1 & 1 & 1 & 1 & 1 & 1 & 1 \end{bmatrix}$$

Embodiments described herein provide various benefits. In particular, embodiments enable image quality to be assessed in applications where corresponding pairs of reference and distorted images are available for analysis, using systems and methods that are readily implemented in real-time and automated systems and yield results that align well with human perception across different types of distortions. This invention provides an "end-to-end" solution for automatic image quality assessment, accepting a pair of reference and distorted images as an input, and providing a meaningful image quality metric as an output.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A system for assessing image quality of a distorted image relative to a reference image, the system comprising:
    a convolutional neural network that accepts as an input the distorted image and the reference image, and provides as an output a metric of image quality;
    wherein the convolutional neural network comprises a plurality of layers comprising:
        an input layer configured to apply a normalizing function to image patches making up each of the distorted image and the reference image to provide a normalized distorted image and a normalized reference image; and
        a convolution layer configured to convolve each of the normalized distorted image and the normalized reference image with N1 filters to provide N1 pairs of feature maps, each pair containing one filtered normalized distorted image and one correspondingly filtered and normalized reference image, where N1 is an integer greater than unity.

2. The system of claim 1 wherein the plurality of layers further comprises:

a linear combination layer configured to compute N2 linear combinations of the N1 feature maps provided from each of the normalized distorted image and the normalized reference image, providing N2 pairs of combined feature maps, each pair containing one combination of filtered normalized distorted images and one corresponding combination of filtered and normalized reference images, where N2 is an integer greater than unity;

a similarity computation layer configured to compute N2 similarity maps, each similarity map based on corresponding pixels from a different one of the N2 pairs of combined feature maps; and a pooling layer configured to apply an average pooling for each of the N2 similarity maps to provide N2 similarity input values.

3. The system of claim 2 wherein the plurality of layers further comprises:

a fully connected layer configured to act on the N2 similarity input values to provide M hidden node values, where M is an integer greater than N2; and a linear regression layer configured to map the M hidden node values to a single output node to provide the metric of image quality.

4. The system of claim 3 wherein N1=N2 and N1=10.

5. The system of claim 3 wherein M=800.

6. The system of claim 1 wherein a squared activation function is applied at each node of the N1 pairs of feature maps before the N1 pairs of feature maps are provided by the convolution layer to any subsequent layer of the plurality of layers.

7. A method for assessing image quality of a distorted image relative to a reference image, the method comprising:

inputting the distorted image and the reference image to a convolutional neural network configured to process the distorted image and the reference image and provide as an output a metric of image quality;

wherein the processing performed by the convolutional neural network comprises:

applying a normalizing function to image patches making up each of the distorted image and the reference image to provide a normalized distorted image and a normalized reference image; and convolving each of the normalized distorted image and the normalized reference image with N1 filters to provide N1 pairs of feature maps, each pair containing one filtered normalized distorted image and one correspondingly filtered and normalized reference image, where N1 is an integer greater than unity.

8. The method of claim 7 further comprising:

computing N2 linear combinations of the N1 feature maps provided from each of the normalized distorted image and the normalized reference image, providing N2 pairs of combined feature maps, each pair containing one combination of filtered normalized distorted images and one corresponding combination of filtered and normalized reference images;

computing N2 similarity maps, each similarity map based on corresponding pixels from a different one of the N2 pairs of combined feature maps; and applying an average pooling for each of the N2 similarity maps to provide N2 similarity input values.

9. The method of claim 8 further comprising:

inputting the N2 similarity input values to a fully connected layer to provide M hidden node values, where M is an integer greater than N2; and mapping the M hidden node values through a regression layer to provide the metric of image quality.

10. The method of claim 9 where M=800.

* * * * *